Feb. 10, 1959 G. VALENSI 2,873,310

COLOR TELEVISION RECEIVER

Filed July 22, 1957 6 Sheets-Sheet 1

INVENTOR
Georges Valensi
BY: Michael S. Striker
ATTORNEY

Feb. 10, 1959 G. VALENSI 2,873,310

COLOR TELEVISION RECEIVER

Filed July 22, 1957 6 Sheets-Sheet 2

INVENTOR
Georges Valensi
BY: Michael S. Striker
ATTORNEY

Feb. 10, 1959 G. VALENSI 2,873,310

COLOR TELEVISION RECEIVER

Filed July 22, 1957 6 Sheets-Sheet 3

INVENTOR
Georges Valensi
BY: Michael S. Striker
ATTORNEY

Feb. 10, 1959 G. VALENSI 2,873,310

COLOR TELEVISION RECEIVER

Filed July 22, 1957 6 Sheets-Sheet 4

INVENTOR
Georges Valensi
BY: Michael S. Striker
ATTORNEY

Feb. 10, 1959 G. VALENSI 2,873,310

COLOR TELEVISION RECEIVER

Filed July 22, 1957 6 Sheets-Sheet 5

INVENTOR
Georges Valensi
BY: Michael S. Striker
ATTORNEY

INVENTOR
Georges Valensi
BY: Michael S. Striker
ATTORNEY

United States Patent Office 2,873,310

Patented Feb. 10, 1959

2,873,310

COLOR TELEVISION RECEIVER

Georges Valensi, Geneve, France

Application July 22, 1957, Serial No. 673,454

Claims priority, application France August 14, 1952

1 Claim. (Cl. 178—5.4)

The present invention relates to a receiver for a color television system involving color transmission of elemental areas of the televised object wherein a brightness signal $t$ and a coded color signal T are used in accordance with the teachings of U. S. Patent 2,375,966, and is a continuation-in-part of application Serial No. 365,719, filed July 2, 1953 and now abandoned.

Figure 1 represents the Maxwell color triangle, in which the surface between the locus of the spectrum and the purple line is divided in sectors numbered 1 to 9; each sector represents a color and the corresponding coded color signal is an electric voltage proportional to the order N of said sector.

The object of this invention is to provide a compatible color television receiver characterized by a cathode ray tube with a fluorescent screen which is a mixture of a plurality of phosphors, said mixture being homogeneous and of constant thickness on the whole surface of the screen; the Wehnelt cylinder of said tube is energized by the coded color signal T; a post-accelerating anode located close to the fluorescent screen is energized by the brightness signal $t$; the mixture of phosphors is such that the color at the point where the electrons of the cathode ray beam impinges varies with the density of said beam which is determined by said coded color signal T, whereas the brightness of said point varies with the velocity of the impinging electrons which is determined by said brightness signal $t$.

for variations in wave length $\lambda$, or order N of the sectors of Maxwell's triangle.

Figure 8:
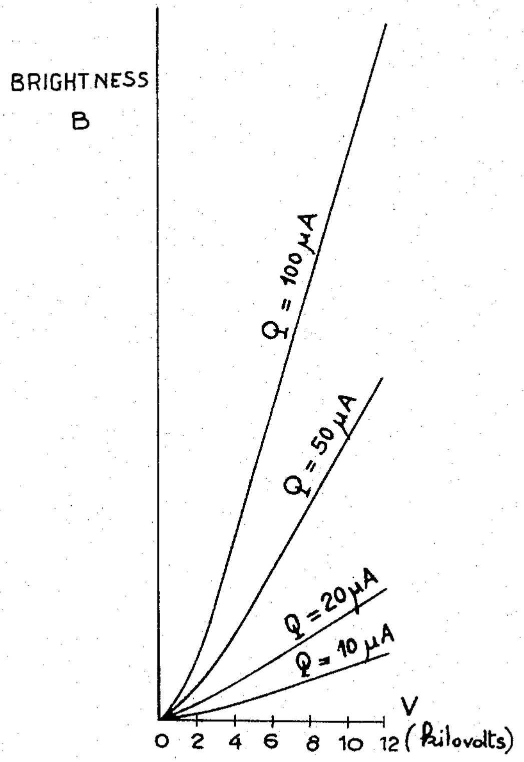

Figure 8 illustrates a set of characteristic curves of the screen brightness for different values of modulating voltages, said curves showing linearity above a certain voltage threshold.

Figure 9:
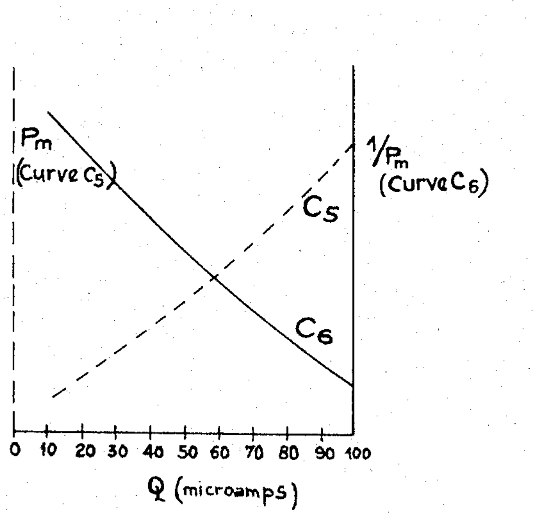

Figure 9 illustrates a curve useful in explaining how the characteristics of a non-linear amplifier, forming part of the receiver, is determined.

Figure 2:
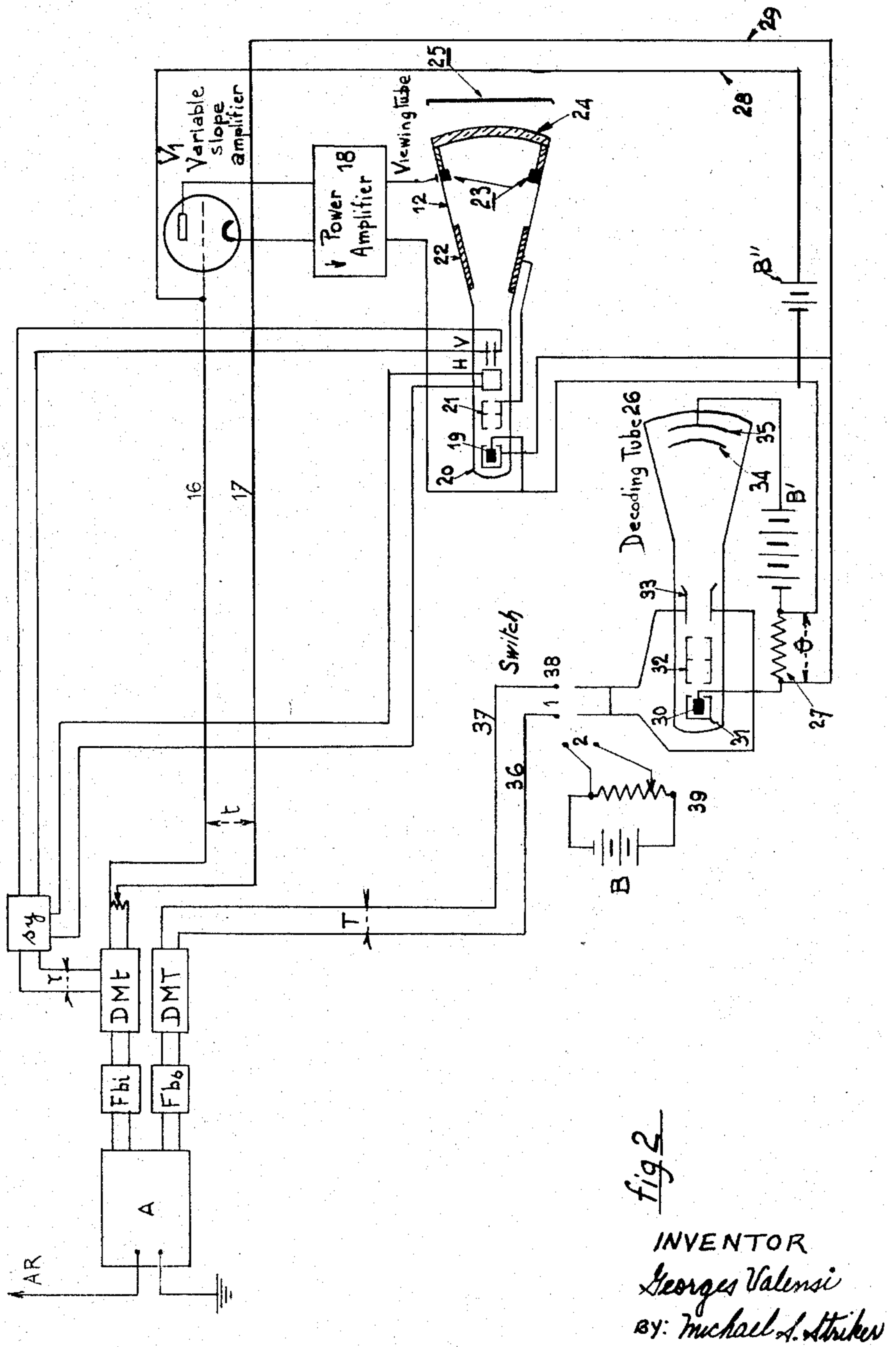
Figure 2 illustrates the television receiver in accordance with the invention.
Figure 3:
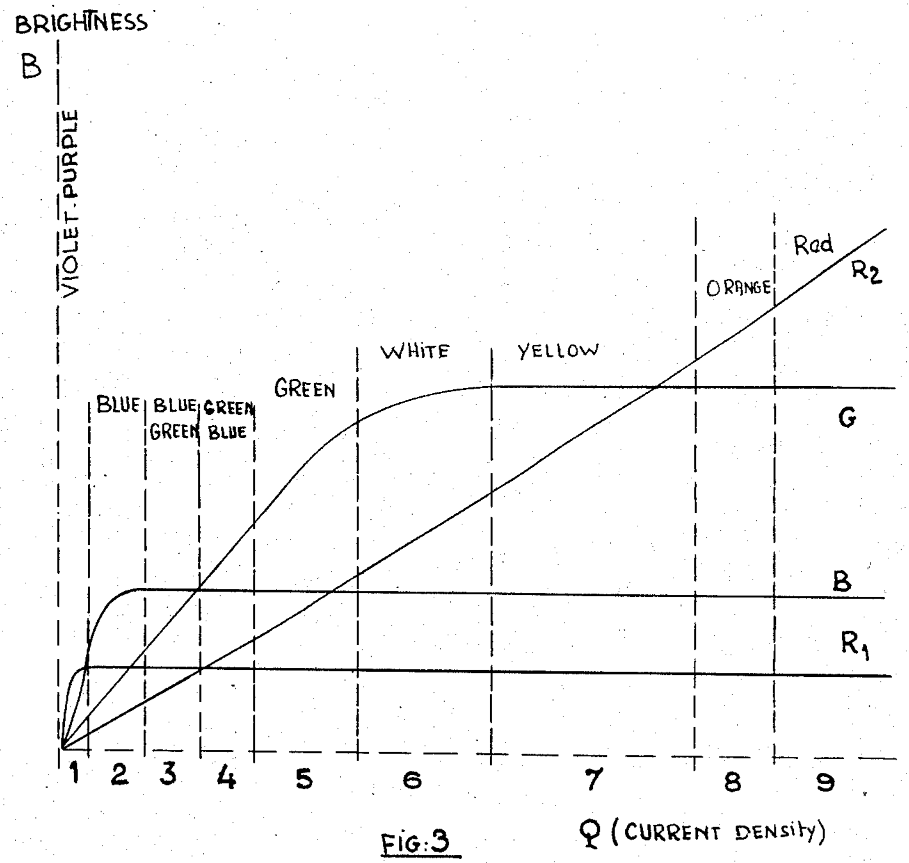
Figure 3 illustrates, in the form of a set of curves, a plot of brightness versus current density for a viewing tube using for its fluorescent screen a mixture of four phosphors.

Figure 2 diagrammatically shows the color television receiver, according to my invention. AR is the receiving antenna, A the high frequency amplifier, F$bi$ and F$bs$ band-pass filters for respectively separating the lower side band (brightness and synchronization) and the upper side band (predominating radiation and purity). At the output of the first demodulator DM$t$, I obtain the synchronization signals $\tau$ and the brightness signals $t$ (monochrome television). At the output of the second demodulator DMT, I obtain the coded signal T (predominating radiation and purity). The synchronization signals act in the usual manner on the synchronization current generator $sy$, which feeds the horizontal deflecting plates H and the vertical deflecting plates V that control the cathode ray beams of the picture cathode ray tube 12 (viewing tube).

The brightness signal $t$ is connected by means of conductors 16 and 17 to the non-linear amplifying stage $V_1$, the characteristic of which is shown on curve $C_6$ of Figure 9 which will be subsequently explained. The output of stage $V_1$ after amplification in the power amplifier 18 is supplied to viewing cathode ray tube 12 between the cathode 19 and the post accelerating anode 23.

The grid bias of stage $V_1$ is obtained from the decoding cathode ray tube 26 and is supplied by conductors 28 and 29 which are connected across the series connection of a resistor 27 and a battery B''.

The viewing cathode ray tube 12 comprises a cathode 19, a modulating electrode (Wehnelt cylinder) 20, a first anode 21, horizontal and vertical deflecting plates H and V, a post accelerating electrode 23, and a fluorescent screen 24. The fluorescent screen 24 will be described in detail further on. In front of said viewing screen is placed an equalizing color filter 25 which will likewise be described in detail hereinafter. The post accelerating electrode 23 is a separate conductive coating on the bulb of CRT 12 well insulated from the ordinary coating 22 used for collecting the secondary electrons which may occur in 12. Electrode 23 is connected to the aluminized coating evaporated on fluorescent screen 24 whereas coating 22 is connected to the anode 21 as shown.

The decoding tube 26 comprises a cathode 30, a control electrode (Wehnelt cylinder) 31, a cylindrical electron lens 32 which gives a flat fan-shaped electrode beam, vertical deflecting plates 33, a mask 34 (which will be described in detail hereinafter with respect to Figure 6), and a collecting electrode 35. The output circuit of the decoding cathode ray tube 26 comprises resistor 27 connected between the cathode 30 and the collecting electrode 35 by means of battery B', which battery supplies the accelerating voltage to the decoding tube 26.

The color coded signal T is applied to the vertically deflecting plates 33 by means of conductors 36 and 37 and by means of the two way switch 38 when the conducting path 1 is closed. When conducting path 2 is closed, a D. C. voltage is applied to the deflecting plates 33 taken from potentiometer 39 which is connected across battery B. The user of the color television receiver shown in Figure 2 should place switch 38 in position 1 when he receives color pictures and in position 2 when he receives monochrome pictures; in this case (if potentiometer 39 is well adjusted) the electronic image K' (Figure 6) of linear cathode 30 of decoding tube 26 constantly remains on the position corresponding to white on mask 34 as explained hereafter. To fully appreciate the operation of tubes 12 and 26, some well known physical principles connected with the phenomenon of fluorescence will be reviewed.

As is well known, the brightness of a fluorescent screen is a function both of the electron beam current density and of the energy of the impinging beam, that is the accelerating voltage of the last anode with respect to the voltage on the cathode. This relationship may be expressed as:

$$(1)\quad B=A.3900.Q.(V-V_0)$$

where A and $V_0$ are coefficients which depend on the particular type of phosphor used. $V_0$ is the energy necessary to counteract the forces which oppose the penetration of the electrons into the phosphor, Q is the current density of the electron beam, and V the anode voltage.

The above relationship is correct only for the linear part of the brightness versus current density characteristic of the phosphor, that is to say for low values of electron beam current Q or for low values of voltage, V. The brightness versus current density characteristic of phosphor shows signs of saturation for high values of electron beam current. This means that if the current density is increased at constant voltage, a saturation threshold is reached where the brightness does not increase any more. In the case of cathode ray tube screens made of a mixture of several phosphors, the saturation bend of which is different, the color of the spot is a function of Q and practically independent of V, while the brightness is function of the product $Q.(V-V_0)$.

Equation (1) gives the value of B in Hefner candles per sq. cm. (1 Hefner candle=0.9 International candle) if Q is measured in amps. per sq. cm. and V and $V_0$ in volts.

When the voltage increases at constant current, the brightness will increase linearly with the voltage as shown by Equation 1.

Figure 5:
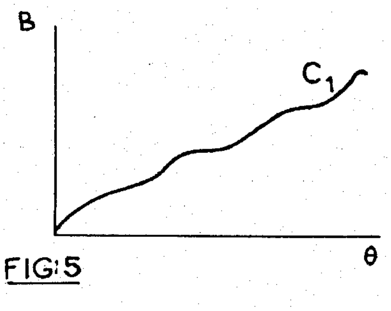
Figure 5 illustrates in a curve the variations of brightness, B, versus variations in modulating voltage, $\theta$.

The fluorescent screen of the viewing cathode ray tube 12 is a mixture of four phosphors the respective colors of which are deep red ($R_1$), blue (B), green (G) and bright red ($R_2$); the characteristics of which are shown by the curves of Figure 5.

The characteristic curve of the fluorescent screen (brightness versus beam current density) indicates a linearly increasing portion followed by a bend and a flat portion corresponding to the saturation region. The slope of the linear portion of the curve is a measure of the electro-optical yield of the phosphor. The sulphide phosphors have a high yield (15 to 20%); the silicates have a lower yield (7% approximatively). The saturation value depends on the activator concentration and occurs at lower brightness values for smaller activator concentrations. In general, lowering the activator concentration does not modify the yield for low current density.

The following table shows by way of example the phosphors which may be used to obtain curves such as are illustrated in Figure 5.

| Phosphor | Color | Chemical composition | Activator | Activator concentration |
|---|---|---|---|---|
| B | blue | Zinc Sulphide ZnS. | Silver Ag | medium. |
| G | green | Zinc silicate $Zn_2SiO_4$. | manganese Mn. | high. |
| $R_1$ | deep red | cadmium sulphide CdS. | silver Ag | very low. |
| $R_2$ | bright red | magnesium silicate $Mg_2SiO_4$. | manganese Mn. | very high. |

Figure 4:
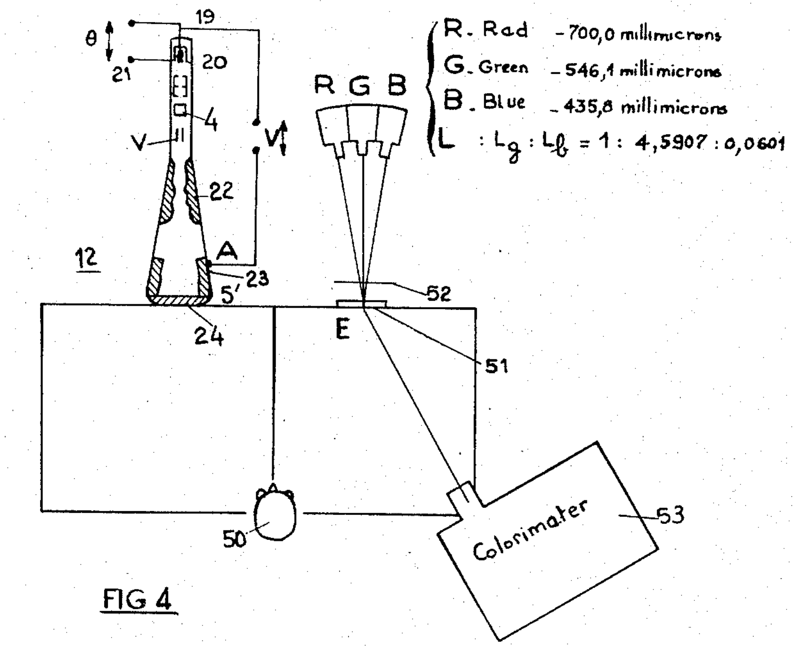
Figure 4 illustrates in diagrammatic form an arrangement for determining the correct values of current densities and anode voltages to be supplied to the viewing tube.

To obtain the correct values of the current density and anode voltage to be supplied to the viewing cathode ray tube, I proceed in the manner illustrated in Figure 4.

Since the visual impressions on an operator's eyes are independent, it is possible to compare the color sensations obtained by the two eyes separately. The viewer 50 looks with his left eye at the screen 24 of cathode ray tube 12 and with his right eye at a mat glass screen 51 on which three search lights (a red one R, a green one G, and a blue one B) are focussed through a graduated transparency plate filter 52 (acting as a photometric wedge).

The viewer closes alternately his right and left eye and adjusts the wedge 52 as well as the intensity of the three search lights so as to obtain the same visual impressions with both eyes for each set of values of the modulating voltage $\theta$ and the accelerating voltage V applied to the cathode ray tube 12.

Search lights R, G, B are of the current type used in colorimeters, each light being associated with a potentiometer (not shown) calibrated in values of $r$, $g$, $b$, that is to say, in the trichromatic coordinates of Maxwell's color equi-triangle when the Standard viewer specified by the International Illumination Committee is used. By means of the controlling potentiometers of the lights, the color of the light on screen 51 is modified so as to obtain the same impression as on the screen 24 of cathode ray tube 12. When color similarity is obtained, the wedge 52 is moved until the same brightness impression is obtained from the two pictures.

For each setting of the intensity adjustment of the search lights R, G, B and of the transparency of the plate filter 52, it is possible to find the point of the Maxwell triangle corresponding to the color of the screen as well as the luminance of the screen expressed as $(rL_r+gL_g+bL_b)$, where $L_r$, $L_g$, $L_b$ are the luminosity factors of the monochromatic light sources constituted by the search lights.

It is also possible to obtain a direct measurement of the color and the brightness of screen 24, once the correct settings are made by the viewer, by means of the spectroscopic colorimeter 53. Colorimeter 53 is aimed at the mat glass screen 51.

The accelerating voltage V on tube 12 has a minimum value V min corresponding to the beginning of the linear parts of the curves of Figure 10 (for instance, 4000 volts). The brilliancy and the color of the screen can be measured for several values of the modulating voltage $\theta$ since it can be assumed that the current density is linearly related to said modulating voltage $\theta$.

Figure 1:
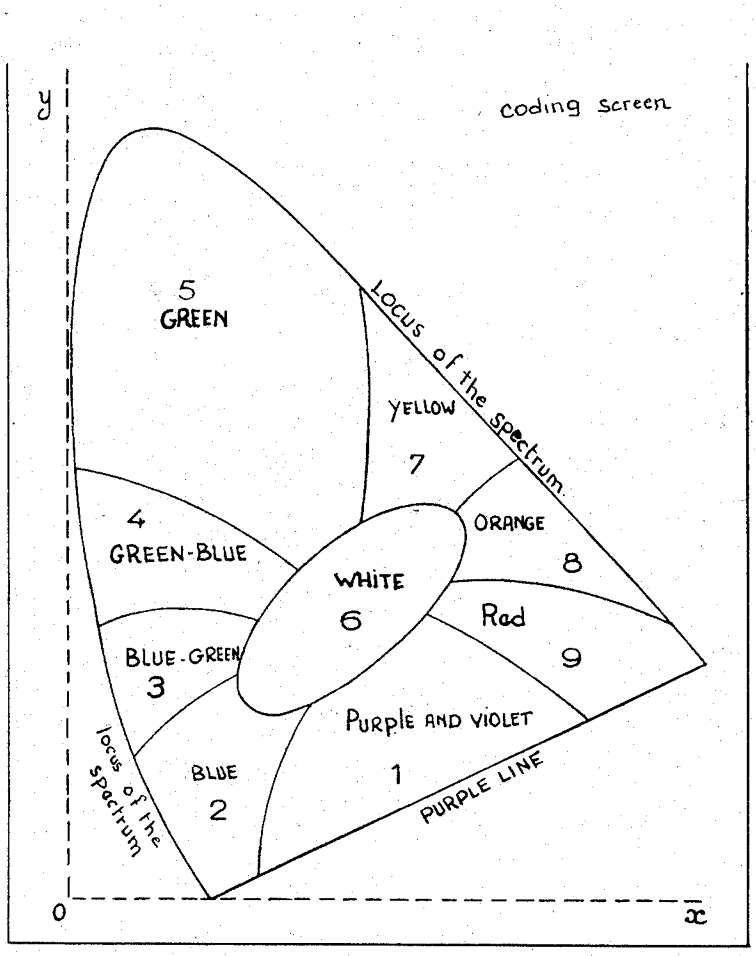

A first curve $C_1$ (Figure 5) is drawn which represents the variations of the brightness B versus the modulating voltage $\theta$ of viewing tube 12. A second curve such as $C_2$ of Figure 6, represents the variations of the modulating voltage $\theta$ necessary to yield specific coded color signal intensities T (and therefore corresponding to the order N of each sector of the Maxwell triangle of Figure 1). From experimental curves $C_1$ and $C_2$ it is possible to obtain curve $C_3$ (Figure 7) which shows the relationship between the brightness $B_0$ and the order N of the sectors of the Maxwell triangle, in as much as each sector of the Maxwell triangle corresponds to a known amplitude value of the coded color signal T. The same curve $C_3$ may be considered as a plot of the dominant wavelength $\lambda$ (hue of the color) instead of N, along the abscissa, versus $B_0$.

Curve $C_4$ which represents the variations of $1/B_0$ versus N (or $\lambda$) is easily obtained from curve $C_3$.

Color filter 25 in front of the viewing cathode ray tube 12 is then manufactured so as to present a transparency-versus-wavelength characteristic identical to curve $C_4$. This is obtained by a deposit (on a transparent glass plate) of appropriate color pigments.

When such a filter is placed in front of the viewing screen 24, the minimum brightness $B_0$ at the minimum accelerating voltage V min is independent of the color of the screen.

Figure 6:
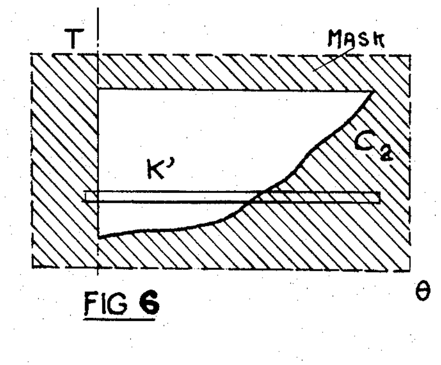
Figure 6 represents the variations of modulating voltage, $\theta$, versus the coded color signal intensity, T.
Figure 7:
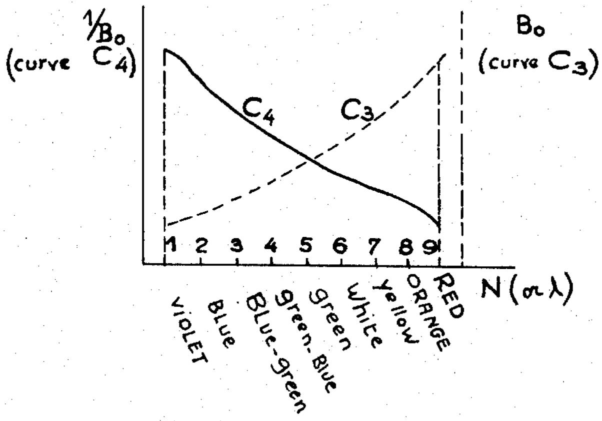
Figure 7 illustrates two curves showing respectively the variations of brightness, B and $$\frac{1}{B}$$

Mask 34 of the decoding tube is obtained by cutting from a plate shown as the dotted rectangle of Figure 6, the area which is defined by curve $C_2$ and a horizontal line. The mask is placed into the decoding tube so that the horizontal line is at the bottom and the curve at the upper part of the mask.

As mentioned before the electron gun of the cathode ray tube yields a fan-shaped plane electron beam, a transverse section of which is shown at K' in Figure 6. The electron beam is assumed to be travelling in a direction which is perpendicular to the plane of the mask. The electron beam is deflected upwards and downwards by the color coded signal T which is applied to the vertical deflecting plates. As shown in Figure 6, the proportion of the electrons of the beam which are transmitted to the collecting electrode depends on the profile of the mask.

When the data have been obtained for a particular set of values of $\theta$, tube 24 is once more connected as shown on Figure 4 and the modulating voltage $\theta$ is maintained constant while the anode voltage is varied in a large voltage range above V min., assuming a particular type of tube. The color of the screen is constant and as said before, the brightness of the screen is linearly increasing with the accelerating voltage in said range. It is possible to obtain a set of linear characteristic curves of the screen brightness, as shown on Figure 8, for different values of modulating voltages $\theta$ corresponding to different values of the current density Q. Each experimental curve yields a measured value of the mean slope P*m*. Curve $C_5$ of Figure 9 shows the variations of the mean slope P*m* versus the current density, while curve $C_6$ of the same figure shows the variations of the reciprocal of the mean slope versus current density Q.

As can be seen for curve $C_5$, P*m* increases slightly when Q or the modulating voltage $\theta$ increases. Curve $C_6$ is used to determine the gain characteristic of the variable gain amplifier $V_1$ (see Figure 2) versus its bias voltage which is the algebraic sum of $\theta$ and of the voltage of battery B''.

Since it is necessary to provide a large range of variations of the anode voltage of the viewing cathode ray tube, it is necessary to provide a power amplifier 18 between the variable gain amplifying stage $V_1$ and the cathode ray tube 12.

When switch 38 is in position 1, as shown on Figure 2, the coded color signal T is applied to the deflecting plates 33 of the decoding tube 26; therefore as already explained, the mask 34 intercepts a part of the beam, the amount of interception varying according to the profile of the mask (according to curve $C_2$) and to the intensity of the coded color signal T. Therefore, the decoded signal $\theta$ across 27 (see Figure 4) is such that the brightness of the screen of the viewing screen is independent of the color of the spot. Therefore, the brightness of the screen is only modulated by the brightness signal $t$ applied to its post accelerating electrode 23.

On the other hand, the color of the spot on the viewing screen is independent of the brightness signal due to the effect of equalizing color filter 25.

When switch 38 is in position 2, a constant D. C. voltage is applied to the decoding tube 26 and therefore the decoded signal $\theta$ is constant and so is the color of the screen of the viewing cathode ray tube, whatever the intensity of the beam. The value of the constant voltage is preset so that the color of the screen is the one desired (white in general).

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A fully compatible color television receiver adapted to receive from a transmitting station, a luminance signal $t$ proportional to the brightness of the element of the televised object scanned at a given instant, and a chrominance signal T proportional in a predetermined manner to the predominant wave length and the factor of colorimetric purity corresponding to the color of the element of the televised object, comprising, in combination, a color decoding tube including an emitter of electrons, means for deflecting the electron beam, said means being electrically controlled by said chrominance signal, a decoding mask for intercepting part of the electrons, a collector of electrons and output signal means connected between said emitter and collector of electrons for developing an output signal $\theta$ across said output means; a variable slope amplifying tube, the grid of which is biased by said output signal $\theta$ and is submitted to the controlling action of said luminance signal $t$; power amplifier means connected to the output of said variable slope amplifying tube; and a viewing cathode ray tube for the reproduction of color or black and white pictures including an emitter of electrons, an electrode for modulating the intensity of the electron beam, said electrode being electrically controlled by said output signal $\theta$ produced by said decoding tube itself under control of said chrominance signal T, a fluorescent screen composed of a mixture of fluorescent substances, said mixture being homogeneous and having a constant thickness on the whole surface of said screen, the color of said mixture varying with the value of the electron beam density and the brightness of said mixture depending on the velocity of the electrons which impinge upon the fluorescent screen, a brightness equalizing filter in front of said fluorescent screen, and a post accelerating electrode electrically connected to the output of said power amplifier means and being controlled by said luminance signal $t$, whereby at any instant the luminous spot produced by the electron beam on said fluorescent screen of said viewing tube has the same brightness and the same color as the element of the televised object which is scanned at this instant.

No references cited.